United States Patent
Nienhaus

(10) Patent No.: US 6,857,457 B2
(45) Date of Patent: Feb. 22, 2005

(54) ROTARY FEEDTHROUGH FOR A DEVICE FOR INFLATING OR DEFLATING A TIRE OF A TRACTOR WHEEL

(75) Inventor: Clemens Nienhaus, Neunkirchen-Seelscheid (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/374,383

(22) Filed: Feb. 25, 2003

(65) Prior Publication Data

US 2003/0159766 A1 Aug. 28, 2003

(30) Foreign Application Priority Data

Feb. 26, 2002 (DE) .......................................... 102 08 024

(51) Int. Cl.⁷ ............................................... B60C 23/00
(52) U.S. Cl. ...................................... 152/417; 152/415
(58) Field of Search ............................... 152/415, 416, 152/417; 277/562, 563, 565

(56) References Cited

U.S. PATENT DOCUMENTS

| | | | | |
|---|---|---|---|---|
| 4,431,043 A | * | 2/1984 | Goodell et al. | 152/417 |
| 4,804,027 A | | 2/1989 | Runels | |
| 5,147,494 A | * | 9/1992 | Torii et al. | 156/417 |
| 5,823,541 A | * | 10/1998 | Dietle et al. | 277/320 |
| 6,145,558 A | | 11/2000 | Schmitz | |
| 6,412,525 B1 | * | 7/2002 | Nienhaus | 141/38 |

FOREIGN PATENT DOCUMENTS

| | | |
|---|---|---|
| DE | 1 907 082 | 9/1970 |
| DE | 1 605 743 | 1/1971 |

* cited by examiner

Primary Examiner—Russell D. Stormer
(74) Attorney, Agent, or Firm—Harness, Dickey & Pierce, P.L.C.

(57) ABSTRACT

A rotary feedthrough for a device to inflate and deflate a tire on a tractor wheel has a housing (13) with an inner member (28) arranged at a radial distance within the housing. The radial gap is bridged by two radially distanced closing elements (18, 22). The inner member (28) is supported in the closing elements (18, 22). Two seal combinations, including respectively, a first sealing ring (35) and a second sealing ring (41), are arranged mirror-invertedly to the inner member (28). The first sealing rings (35), with a first sealing face (36), abut a counter sealing face (21) or (25) of the closing elements (18, 22), respectively. Each first sealing ring (35) can be moved axially along the longitudinal axis Y. Each first sealing ring (36) is fixed rotationally to the inner member (28). Each first sealing ring (35) is acted upon by a second sealing ring (41). An annular edge of a sealing portion (43) abuts the second sealing face (36) of the first sealing ring (35) and presses the same against the counter sealing face (21) or (25), respectively, under the pressure present in the chamber K.

8 Claims, 3 Drawing Sheets

ROTARY FEEDTHROUGH FOR A DEVICE FOR INFLATING OR DEFLATING A TIRE OF A TRACTOR WHEEL

CROSS-REFERENCE TO RELATED APPLICATIONS

This application claims priority to German Patent Application No. 10208024.0 filed Feb. 26, 2002, which application is herein expressly incorporated by reference.

FIELD OF THE INVENTION

The invention relates to a rotary feedthrough for a device to inflate a tire on a vehicle wheel, especially a tractor wheel.

BACKGROUND OF THE INVENTION

In tractors, a change in tire pressure is especially important. When working in the field, a lower tire pressure provides a lower ground compaction and higher traction. At high speeds, e.g. 40 km/h, tractors with low tire air pressure generally have a driving instability. In the trade paper, profi-magazin for agricultural technology, October/1995 "The air pressure in the tire: Small causes, large effects" different regulating devices are found. According to this, the rotary feedthroughs are arranged on the wheel flange according to the axle type either on the inner side or the outer side of the wheel. In less expensive systems, the air feed is carried out passed the outside of the tire up to the rotary feedthrough. In an arrangement with an intermediate flange between the wheel and the wheel flange the attachment of the rotary feedthrough is achieved via the wheel screws. This embodiment has an advantage since conduits are not exposed to the outside. However, the critical screw connection is loaded even higher by the enlarged free bending length of the wheel screws.

U.S. Pat. No. 4,804,027 describes a device for inflating and deflating a tire on a wheel of a vehicle fillable with air. The device is integrated into the wheel hub, which supports the wheel flange. The wheel hub forms the outer member with a channel, to which a connection line is connectable, which leads to the tire. An inner member is supported in the hub. The inner member is kept stationary and is connected to a pressure source. Two seals are non-rotatably arranged on the inner member and distanced from each other. The two seals together with a valve arrangement enclose an annular chamber. The valve arrangement includes a spring loaded valve. The valve is opened when a predetermined pressure is exceeded in the chamber. This allows the air to flow into the channel of the wheel hub. The valve, however, is formed so that it only opens when the seals abut the corresponding bore face of the wheel hub lying radially to the outside. The seals are always pressed against the corresponding counter face of the wheel hub with the total pressure that is present to inflate the tire. At high relative speeds this is disadvantageous. At high speeds, the high pressure leads to a high friction and, therefore, also to a corresponding high wear of the seals. A further disadvantage is that the hub and the inner member are supported independently from each other on a further component. Thus, radial deviations completely act on the seals.

DE OS 1 605 743 describes a device that controls the tire pressure in vehicles. It describes a rotary feedthrough with an outer member and an inner member. The outer and inner members are rotatably sealed relative to each other and are sealed with contact seals towards each other and constantly carry out a relative movement.

A tire inflating device is also described in DE-OS 1 907 082. This reference discloses that it is necessary for vehicles with relative high circumferential speeds, to switch off the rotary feedthrough during normal operation. Accordingly, during the non-actuation of the tire inflating device, no pressure is present. This eliminates problems that arise at the seal elements of the rotary connection. This problem is especially obvious, when large relative speeds are present, as is the case in the usage in tractors.

In all the arrangements described above and belonging to the State of the Art, the seals, which are formed as soft seals, have a high wear at their seal lips, which leads to a short life span.

SUMMARY OF THE INVENTION

The invention has an object to provide a rotary feedthrough where a secure seal is achieved over a long life span.

This object is solved by a rotary feedthrough for a device to inflate and deflate a tire on a vehicle wheel, especially a tractor wheel, which includes a housing with a housing bore centered on a longitudinal axis. The housing bore forms an inner face. Also, the housing has a first connection bore. An inner member is arranged in the housing bore. The inner member has an outer face arranged to be radially distanced to the inner face. Two closing elements are axially arranged with a distance between each other. The closing elements bridge the radial distance between the inner face of the housing and the inner member. The closing elements rotatably support the housing and the inner member around each other. The closing elements along with the housing and inner member enclose a chamber and form a counter sealing face towards the chamber. At least one closing element is a separate component from the housing and the inner member. A sealing arrangement is positioned in the chamber. The sealing arrangement has, per each closing element, a first sealing ring. The sealing ring has a radially extending first sealing face to axially sealingly abut the counter sealing face of the corresponding closing element. The sealing ring has a second sealing face that extends parallel to the first sealing face and is axially displaceably guided along the longitudinal axis. The sealing arrangement has, per each closing element, a second sealing ring. The second sealing ring has an annular actuating portion and an attached annular membrane-like sealing portion. An annular edge, distanced from and facing away from the actuating portion, axially abuts the second sealing face of the first sealing ring.

An advantage of this construction is that between the two sealing rings, formed as soft seals, and the two sealing faces of the first sealing rings no difference in the number of revolutions is present. Thus, the sealing rings practically show no wear. The first sealing rings are stable in shape and have a flat first sealing face and are preferably made from a form stable plastic. The corresponding counter sealing face of the mating closing element abuts the flat first sealing face. Also, a design with a base ring made from plastic or metal is possible. Here, the ring has a coating at least on the first sealing face. The first sealing rings seal the radial gap towards the closing element. The second sealing rings seal the axial gap between each first sealing ring and the component, to which the second sealing rings are arranged. The sealing portion of the second sealing ring acts upon the first sealing ring in the axial direction to abut the counter sealing face of the mating closing element. This is achieved by the pressure present in the chamber. The first sealing ring is displaceably arranged along the longitudinal axis. Thus, it is kept in abutment with the closing element to achieve wear compensation. The sealing portion of the second sealing ring can be formed such that its free annular edge, which abuts the second sealing face of the first sealing ring, even at the desired wear compensation effectively abuts the second sealing face of the first sealing ring.

Preferably, the components belonging to the sealing arrangement in the chamber, namely the first sealing rings and the second sealing rings, are arranged on the inner member. The first sealing rings are attached axially displaceable and the second sealing rings with their attachment portion are fixed on the inner member. The first sealing rings are rotationably fixed to the inner member around the longitudinal axis to achieve distinctive movement relationships. Thus, a relative movement in the circumferential direction produced between the first sealing ring and the second sealing ring should be prevented.

In cases where the closing elements are connected to the housing, the arrangement of the sealing arrangement is on the inner member. Here, one closing element is integrated into the housing and the other closing element is detachably connected to the housing. The detachable arrangement of one closing element is necessary to be able to mount the components belonging to the rotary feedthrough.

The first sealing face of the first sealing ring is formed as an annular face. The first sealing ring has a small diameter and a large diameter. The first sealing ring, furthermore, has an inner diameter and an outer diameter. In the arrangement of the first sealing ring in the inner member, the small diameter is equal to or larger than the inner diameter and that the large diameter is equal to or smaller than the outer diameter. Thus, the first sealing face is smaller than an annular face limited by the inner diameter and the outer diameter. The abutment relationships with reference to the abutment of the first sealing ring with its first sealing face on the counter sealing face of the corresponding closing element is such that under the existing pressure conditions in the chamber no excess loading and no excessive wear is present, however, the necessary sealability is achieved. The pressure, acting on the annular face of the first sealing ring, which limits the relief chamber, acts against the pressure of the sealing portion of the second sealing ring. The residual face of the second sealing face of the first sealing ring, which is not covered by the sealing portion of the second seal, is acted upon by the same pressure as the chamber. By changing the position of the first sealing face in the radial direction by a means of different size lay-out of the small diameter and corresponding change of the large diameter to achieve the same area, the resulting abutment forces of the first sealing ring with its first sealing face against the corresponding counter sealing face and resulting surface pressure can be changed.

In one embodiment of the invention, the arrangement of the first sealing ring on the inner member and the lay-out of the larger diameter to a value smaller than the outer diameter forms a relief chamber between these and the counter sealing face of the corresponding closing element. The relief chamber is connected to the chamber. Thus, the relief chamber is acted upon by the same pressure. In this arrangement, the first sealing face is always smaller than the face limited by the inner diameter and the outer diameter. To keep the friction small with reference to the support of the inner member in the housing small, a friction bearing element is arranged, respectively, to the closing elements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
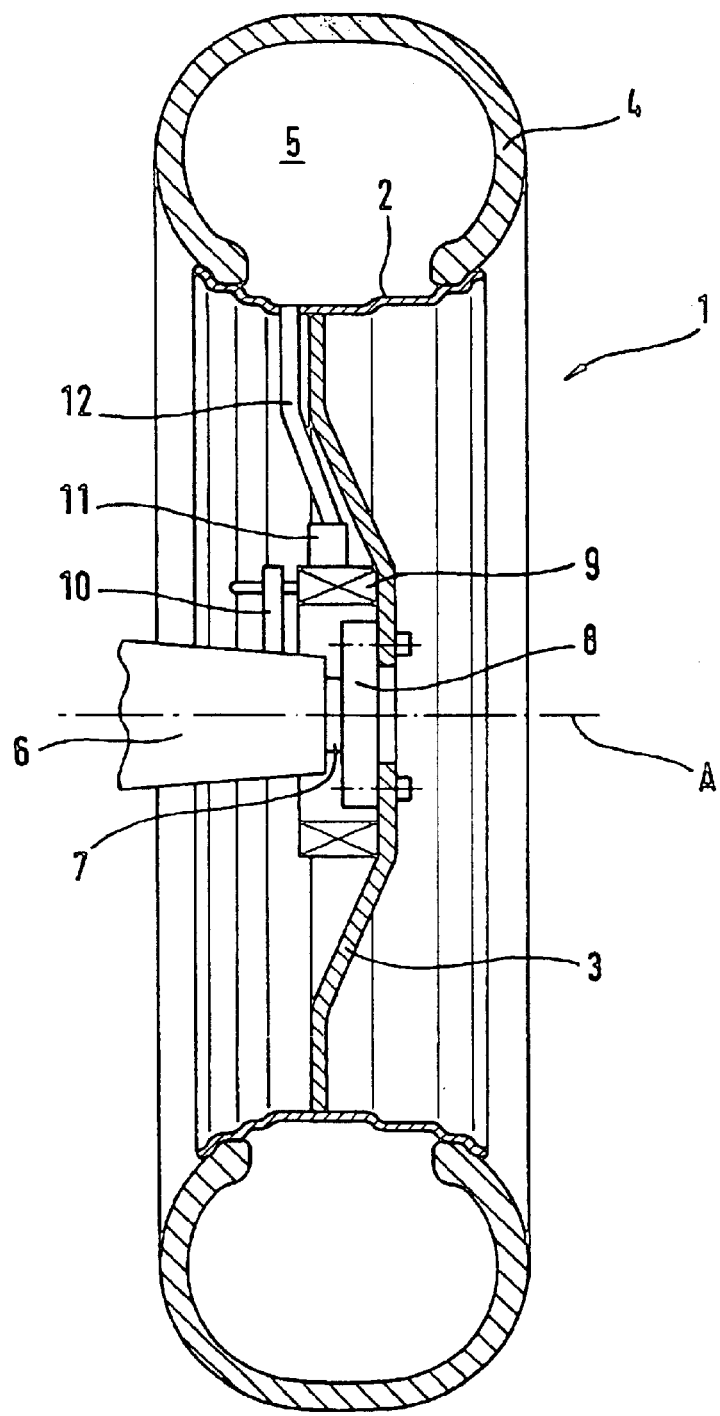
FIG. 1 shows a sectional view of a tractor wheel arranged to an axle housing of a tractor.

The tractor wheel 1 represented in FIG. 1 includes a wheel rim 2, a wheel center member 3 supporting the wheel rim 2 and a tire 4 on the wheel rim 2. The inner chamber 5 is enclosed by the tire 4 and the wheel center member 3. The tractor wheel 1, arranged on the axle body 6 of a tractor, is only partially represented. It is especially mounted on the flange 8 of the axle shaft 7. The rotary feedthrough 9 is arranged relative to the wheel center member 3. The inner member is kept stationary by a holder 10 attached, for example, to the axle body 6. The outer member of the rotary feedthrough 9 rotates with the tractor wheel 1. The valve 11 is attached to the outer member of the rotary feedthrough 9. This valve 9 is connected by an air duct 12 to the inner chamber 5. The feed of air pressure is achieved through the holder 10 to the rotary feedthrough 9 and therefrom by the valve and the air duct 12 to the inner chamber 5.

Figure 2:
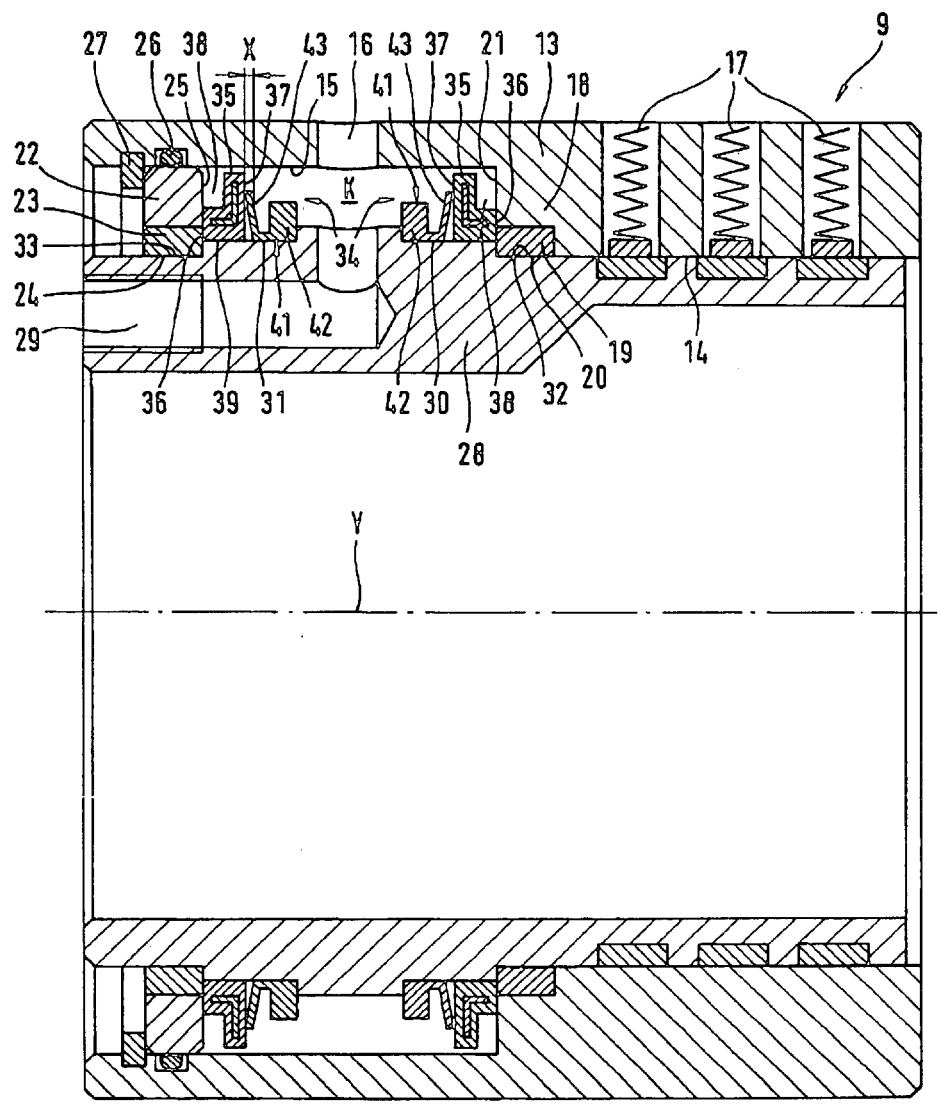
FIG. 2 shows a longitudinal sectional view of a rotary feedthrough according to the invention with a first embodiment of first sealing rings.
Figure 3:
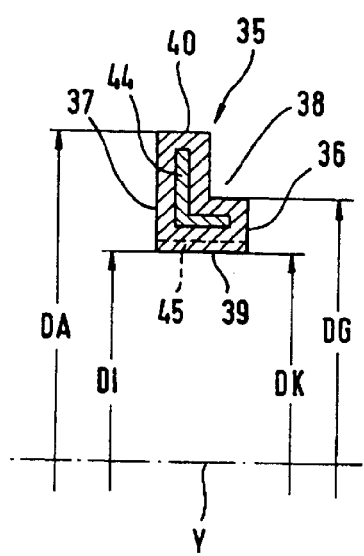
FIG. 3 shows a half longitudinal sectional view of a first sealing ring according to the embodiment of FIG. 2.
Figure 4:
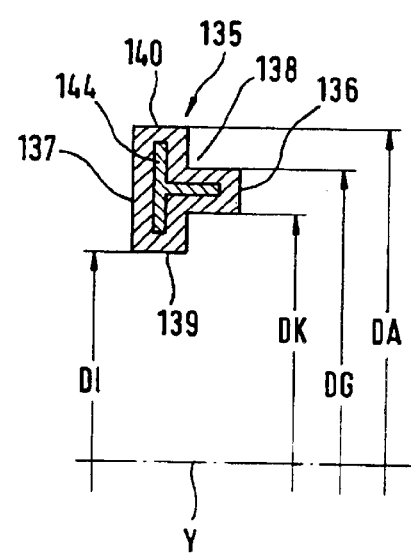
FIG. 4 shows a half longitudinal sectional view of a second embodiment of the first sealing ring.

The design of the rotary feedthrough 9 is described in detail by means of FIGS. 2 to 4.

The rotary feedthrough 9 includes housing 13 with a bore 14 as well as a housing bore 15. The bore 15 has an enlarged diameter compared to the bore 14. The housing bore 15 is open to the left front face of the housing 13. In the area of the housing bore 15 a first connection bore 16 is provided. The connection bore 16 extends through the wall of the housing 13 in the area of the housing bore 15. The connection bore 16 connects with the valve, shown in FIG. 1.

Slip-ring transmitters 17 are arranged in the housing 13. The slip-ring transmitters 17 serve to transmit signals to the valve. The housing bore 15 is closed by a first closing element 18. The closing element 18 supports a first friction bearing element 19 within the first bearing bore 20. A second closing element 22, which is a separate component from the housing 13, closes the other end of housing bore 15. The first closing element 18 forms a first counter sealing face 21. The second closing element 22 has a second counter sealing face 25 that opposes the first sealing face 21. The second closing element 22 supports a second friction bearing element 23 in the second bearing bore 24. A seal 26, in the form of an O-ring, is mounted in a groove of the housing 13. The seal 26 serves to seal between the second closing element 22 and the housing 13. The two closing elements 18, 22 are arranged with an axial distance between each other. The second closing element 22 is detachable from the housing 13. The second closing element 22 is kept in its axial position by a retaining ring 27.

The inner member 28 is supported in the housing 13. The inner member 28 has an air channel 29. Air channel 29 leads to the chamber K, enclosed by the housing 13, the inner member 28 and the two closing elements 18, 22. The pressurisation of the chamber K is achieved, via the air channel 29, by a compressed air reservoir or a compressor, not represented, and mounted stationarily on the tractor. The inner member 28 has a portion which sits in the bore 14. The portion includes components belonging to the slip-ring transmitter 17 for the transmission of signals.

The inner member 28 has a first seat face 30 in the area of the first closing element 18 and a second seat face 31 closes to the second closing element 22. The inner member 28 has a first bearing face 32 reduced in diameter compared to the first seat face 30 and the second seat face 31 and a second bearing face 33. The inner member 28 is supported by the first bearing face 32 in the first bearing bore 20 of the first friction bearing element 19. The inner member 28 is supported by the second bearing face 33 in the second bearing bore 24 of the second friction bearing element 23 belonging to the second closing element 22. A first sealing ring 35 and a second sealing ring 41 are arranged on the first seat face 30 and the second seat face 31, respectively, in a mirror-inverted arrangement. The two first sealing rings 35 are formed according to FIG. 3.

The further description of the first sealing rings 35 is made with reference to FIG. 3. The two first sealing rings 35 together with the first sealing face 36 interact with the corresponding first counter sealing face 21 or second counter sealing face 25, respectively. Parallel to the radially extending first sealing face 36 the first sealing ring 35 has a second sealing face 37. The second sealing face 37 is facing away from the first sealing face 36 and has a larger area than the first sealing face 36. The first sealing rings 35, according to FIGS. 2 and 3, have a first sealing face 36 which has a small diameter DK, which corresponds to the inner diameter DI of the first sealing ring 35.

The first sealing rings 35 are arranged with the bore 39 with the inner diameter DI on the first seat face 30 or the second seat face 31, respectively, such that they are adjustable in the axial direction along the longitudinal axis Y, in rotational direction. However, the sealing rings 35 have to rotate around the axis Y together with the inner member 28. This can be achieved, for example, by the arrangement of one or more axially extending grooves 45 in the first sealing ring 35. The grooves 45 interact with a not represented wedge, partially embedded in the first seat face 30 and the second seat face 31 and extending parallel to the longitudinal axis Y.

As the large diameter DG of the first sealing ring 35 is smaller than the outer diameter DA of the first sealing ring 35, a relief chamber 38 is formed between the first counter sealing face 21 and the second counter sealing face 25 and the first sealing rings 35. These relief chambers 38 are connected to the chamber K since the outer diameter DA of the first sealing rings 35 is smaller than the diameter of the housing bore 15. A pressure present in the chamber K is also present in the relief chambers 38. The annular face between the large diameter DG and the outer diameter DA in the area of the chamber tries to lift off the first sealing rings 35 from the corresponding counter sealing face 21 or 25, respectively, under the influence of the pressure, present in the chamber K. The first sealing rings 35 are however acted upon by the preloading force of the sealing portions 43 of the second sealing rings 41 and by the pressure acting on these sealing portions 43 in the chamber K, so that their first sealing face 36 are correspondingly pressed against the counter sealing face 21 or 25, respectively. Thus, the residual face acts practically in a non supporting way outside of the annular edge of the sealing portion 43 to the outer face 40 with the outer diameter DA. Thus, in the area of the relief chamber 38 a correspondingly large area acting in a reliefing way is produced. This is, however, different, when the large diameter DG of the first sealing face 36 corresponds in size to the outer diameter DA of the first sealing ring 35.

The two second sealing rings 41 are fixed with their attachment portion 42 on the first seat face 30 or the second seat face 31, respectively. The sealing portion 43 is attached near the corresponding seat face 30 or 31 and extends in an inclined way in the direction of the second sealing face 37. The sealing portion 43 abuts the second sealing face 37 with a predefined preloading. If this preloading is not sufficient, springs can be provided, which press the two first sealing rings 35 into abutment with the corresponding counter sealing faces 21 or 25 of the closing elements 18 or 22, respectively. Since the two second sealing rings 41 and the corresponding first sealing rings 35 are fixed to the inner member 28, no relative rotation is produced between the two. The sealing portions 43 of the two second sealing rings 41 enable a specific axial path. Thus, during wear of the first sealing faces 36 of the two first sealing rings 35 an adjustment in the axial direction by the allowed wear X is possible.

Then, when the inner member 28 experiences a relative rotational movement around the longitudinal axis Y compared to the housing 13, no relative movement is produced in the rotational direction between the annular edge and the second sealing face 37. The annular edge of the sealing portion 43 of the second sealing ring 41, in rotational direction around the longitudinal axis Y, is relatively soft compared to the second sealing face 37 of the first sealing ring 35. The wear takes place at the first sealing face 36. The wear compensation by the allowed amount X, which the sealing portion 43 also undergoes, enables a high life span.

The pressure conditions of the first sealing ring 35 with its first sealing face 36 against the first counter sealing faces 21 or 25, respectively, can be varied, on the one hand, by size. The area of the first sealing face 36 and its radial arrangement between the inner diameter DI and the outer diameter DA can be altered. With the same size of the first sealing face 36, as in FIG. 3, an arrangement according to FIG. 4 can be chosen, so that a first sealing face 136 is achieved.

The first sealing face 136 is formed as an annular face and has the same area as the sealing face 36 in the embodiment according to FIG. 3. However, it is arranged on a different diameter. The small diameter DK is larger than the inner diameter DI and the large diameter DG is, with consideration of the area, correspondingly larger than the small diameter DK. Therefore, the relief chamber 138 acted upon by the pressure in the chamber K, the annular face remaining to the outside, is reduced. The face, acting in a relief way, between the large diameter DG and the outer diameter DA is smaller than that in the embodiment according to FIG. 3. The pressure acting on the annular sealing portion 43 of the second sealing ring 41 and the residual face between the outer annular edge of the sealing portion 43, with which the second sealing ring 41 abuts the second sealing face 137, and the outer diameter DA of the outer face 140 leads to a higher surface pressure on the first sealing ring 135 with its first sealing face 136 against the corresponding counter sealing face of the two closing elements, than it is the case in the embodiment according to FIG. 3. According to the desired pressing conditions, the first sealing face 136 can be displaced radially to the outside of the longitudinal axis Y in such a way, that its larger diameter DG corresponds to the outer diameter DA, so that practically the complete face of the sealing portion and the residual face, if provided, produce a high pressing force under the pressure, as no relief chamber is produced.

From FIGS. 3 and 4 it is visible that two first sealing rings 35, 135 include a reinforcement inlay 44, 144 for reinforcement. The inlays 44, 144 enable a high stability to ensure that the first sealing face 36 or 136, respectively, over a long life span provide an exact abutment to the corresponding counter sealing face. In the extreme case the reinforcement inlay 44, 144 can be formed as a metal plate ring. The plate ring is provided with a low friction coating made from synthetic material, which can be machined in the area of the two sealing faces 36, 136 or 37, 137, respectively.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotary feedthrough for a device for inflating or deflating a tire on a vehicle wheel, comprising:
   a housing having a housing bore centered on a longitudinal axis, said housing bore forming an inner face, and said housing having a first connection bore;
   an inner member arranged in the housing bore, said inner member having an outer face, said outer face arranged to be radially spaced from the inner face of said housing;
   two closing elements being axially arranged with a distance between each other, said closing elements bridging the radial distance between the inner face of the housing and the inner member, said closing element rotatably supporting the housing and the inner member around each other and together with said housing and inner member enclose a chamber, and said two closing elements forming a counter sealing face towards the chamber;
   at least one of said two closing elements being separate from the housing and the inner member; and
   a sealing arrangement in the chamber having a first sealing ring for each closing element, each first sealing ring having a radially extending first sealing face for axially sealing abutting the counter sealing face of the corresponding closing element and a second sealing face extend the first sealing face axially displaceably guided along the longitudinal axis, and said sealing arrangement having a second sealing ring for each closing element, each second sealing ring having an annular attachment portion and an annular membrane sealing portion attached thereto, and an annular edge distanced from the attachment portion and facing away from the attachment portion axially abutting the second sealing face of the first sealing ring.

2. The rotary feedthrough according to claim 1, wherein the first sealing rings and the second sealing rings of said sealing arrangement in the chamber being arranged on the inner member, wherein the first sealing rings are axially displaceable and the second sealing rings are stationarily attached with their attachment portion at the inner member.

3. The rotary feedthrough according to claim 1, wherein the first sealing rings are axially displaceable in the direction of the longitudinal axis and are connected to the inner member.

4. The rotary feedthrough according to claim 2, wherein the closing elements are connected to the housing.

5. The rotary feedthrough according to claim 4, wherein one closing element is fixed to the housing and one closing element is attached detachably to the housing.

6. The rotary feedthrough according to claim 1, wherein the first sealing face of the first sealing ring is formed as an annular face and has a small diameter and a large diameter, said first sealing ring further including an inner diameter and an outer diameter, and in the arrangement of the first sealing ring to the inner member the small diameter is equal to or larger than the inner diameter and that the large diameter is equal to or smaller than the outer diameter, wherein the first sealing face is smaller than an annular face limited by the inner diameter and the outer diameter.

7. The rotary feedthrough according to claim 6, wherein in the arrangement of the first sealing ring to the inner member and in the lay-out of the larger diameter to a value smaller than the outer diameter, a relief chamber is formed between the sealing ring and the counter sealing face of the corresponding closing element, said relief chamber being connected to the chamber so that it is acted upon by the same pressure as the chamber.

8. The rotary feedthrough according to claim 1, wherein the closing elements include a friction bearing element.

* * * * *